(12) United States Patent
Takei et al.

(10) Patent No.: US 7,671,849 B2
(45) Date of Patent: Mar. 2, 2010

(54) INPUT DEVICE COMPRISING THIOPHENE DERIVATIVE POLYMER AND PROCESS FOR PRODUCING THE SAME

(75) Inventors: Fumio Takei, Kawasaki (JP); Satoshi Akutsu, Kawasaki (JP); Toru Ito, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/000,960

(22) Filed: Dec. 19, 2007

(65) Prior Publication Data
US 2008/0103242 A1 May 1, 2008

Related U.S. Application Data

(60) Division of application No. 11/166,731, filed on Jun. 27, 2005, now Pat. No. 7,332,107, which is a continuation of application No. PCT/JP03/006591, filed on May 27, 2003.

(51) Int. Cl.
*G06F 3/041* (2006.01)
*H01B 1/12* (2006.01)
(52) U.S. Cl. ............... 345/173; 345/174; 252/500
(58) Field of Classification Search ........... 252/500; 323/904; 359/291, 580; 178/18.06; 345/173, 345/174; 200/512
See application file for complete search history.

(56) References Cited

U.S. PATENT DOCUMENTS

| | | | | |
|---|---|---|---|---|
| 5,286,414 A * | 2/1994 | Kampf et al. | ............... | 252/500 |
| 5,738,934 A * | 4/1998 | Jones | ............... | 428/220 |
| 2002/0092746 A1* | 7/2002 | Kawashima et al. | ............... | 200/310 |
| 2003/0013050 A1 | 1/2003 | Schwark et al. | | |
| 2003/0203534 A1* | 10/2003 | Getz et al. | ............... | 438/100 |
| 2003/0211241 A1 | 11/2003 | Tahon et al. | | |
| 2003/0213624 A1* | 11/2003 | Cross et al. | ............... | 178/18.06 |
| 2004/0152832 A1* | 8/2004 | Kirchmeyer et al. | ............... | 524/800 |
| 2004/0258951 A1* | 12/2004 | Haghighat et al. | ............... | 428/690 |

FOREIGN PATENT DOCUMENTS

JP 61-84942 6/1986

(Continued)

OTHER PUBLICATIONS

Japanese Office Action issued on May 13, 2008 for corresponding Japanese Patent Application No. 2005-500196.

*Primary Examiner*—Mark Kopec
(74) *Attorney, Agent, or Firm*—Westerman, Hattori, Daniels & Adrian, LLP

(57) ABSTRACT

The present invention relates to organic conductive polymer compositions adapted to produce touch panel input devices that hardly undergo resistance degradation even after prolonged and repeated usages, and represent remarkably improved reliability and lifetime in particular. The organic conductive polymer compositions according to the present invention comprise a thiophene derivative polymer, a water-soluble organic compound (except for nitrogen-containing compounds), and a dopant, wherein the thiophene derivative polymer is expressed by the formula (1).

formula (1)

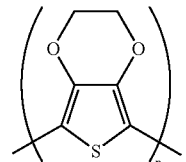

n: an integer of 1 or more.

9 Claims, 2 Drawing Sheets

FOREIGN PATENT DOCUMENTS

| | | |
|---|---|---|
| JP | 62-93818 | 4/1987 |
| JP | 11-506849 | 6/1999 |
| JP | 2000-149661 | 5/2000 |
| JP | 2001-176758 A | 6/2001 |
| JP | 2002-93242 | 3/2002 |
| JP | 2002-316709 | 10/2002 |
| JP | 2003-261749 A | 9/2003 |
| JP | 2004-107552 A | 4/2004 |
| WO | WO 02/079316 A2 | 10/2002 |

* cited by examiner

INPUT DEVICE COMPRISING THIOPHENE DERIVATIVE POLYMER AND PROCESS FOR PRODUCING THE SAME

CROSS-REFERENCE TO RELATED APPLICATIONS

This application is a divisional of application Ser. No. 11/166,731, filed Jun. 27, 2005, which is a continuation of Application PCT/JP2003/006591, filed on May 27, 2003.

BACKGROUND OF THE INVENTION

1. Field of the Invention

The present invention relates to organic conductive polymer compositions adapted to produce touch panel input devices, transparent conductive films formed from the organic conductive polymer compositions, transparent conductors that utilize the transparent conductive films, and input devices that utilize the transparent conductors and processes for producing the input devices.

2. Description of the Related Art

Touch panels are typically disposed on front surfaces of displays such as liquid crystal displays, CRT displays, and electro-luminescence displays and are utilized as input devices. When a finger or a pen edge push a point of touch panel in an arbitrary manner, the point is detected as a coordinate position on a two-dimensional plane, and the coordinate position is outputted as an electric signal into computers or related devices.

Recently, touch panels have been widely utilized for various apparatuses, systems, and the like such as electric notebooks, cellular phones, personal handyphone systems, calculators, electric clocks, global positioning systems, bank ATM systems, vending machines, and POS systems.

Analog touch panels by the use of electric resistance have been widely utilized for various inputting devices, among others. The analog touch panels by the use of electric resistance are typically constructed from a conductive transparent film and a conductive transparent substrate that face each other, and a insulating spacer interposed between them; when a finger or a pen edge pushes a position on the touch panel in an arbitrary manner, the transparent film bends and contacts with the transparent substrate in a partial area then outputs an electrical signal.

Traditionally, polyethylene terephthalate (PET) films with a conductive layer of indium tin oxide (ITO) have been utilized widely for the transparent films. However, some problems have been present that repeating deformations of PET films bring about repeating stresses on ITO conductive layers of ceramic material, resulting in brittle fracture of ITO conductive layers and degradation of resistance; the ITO conductive layers are usually formed over entire surfaces of PET films by means of spattering process, and the patterning of the ITO conductive layers are conducted by lithography, these are considerably complicated and expensive processes; the areas on which wiring patterns being formed are to be insulated by photo resist, solder resist, insulating paste, insulating film and the like, these are also considerably complicated and expensive.

Accordingly, an electrode-bearing article has been proposed wherein a layer formed of conductive polymer and non-conductive polymer is coated additionally on the ITO conductive layer, thereby the discontinuity of ITO conductive layers is compensated and the degradation of resistance is prevented even if the ITO conductive layers undergo brittle fracture due to prolonged and repeated usages, as disclosed in Japanese Patent Application Laid-Open (JP-A) No. 11-506849. However, this proposal suffers from expensive cost for forming the layer of conductive polymer and non-conductive polymer.

Another proposal appears wherein a film containing an organic conductive polymer and p-type inorganic semiconductor is employed in place of the ITO conductive layers, as disclosed in JP-A No. 2002-93242. However, this proposal suffers from insufficient durability of the film under repeated usages for the application of touch panels.

The objects of the present invention are to provide economically organic conductive polymer compositions that can yield easily transparent conductive films with superior transparency and conductivity; transparent conductive films and transparent conductors that can be mass-produced into optional shapes with lower cost, are superior in transparency, electrical conductivity, and flexibility, and are preferable for touch panel input devices; input devices that can be mass-produced into touch panel input devices economically, hardly undergo resistance degradation even after prolonged and repeated usages, and represent remarkably improved reliability and lifetime; and effective processes for producing the input devices.

SUMMARY OF THE INVENTION

The organic conductive polymer composition according to the present invention comprises a thiophene derivative polymer, a water-soluble organic compound (except for nitrogen-containing compounds), and a dopant, wherein the thiophene derivative polymer is expressed by the formula (1).

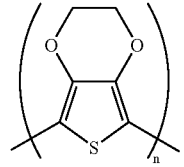

formula (1)

n: an integer of 1 or more

The organic conductive polymer composition according to the present invention may yield easily transparent conductive films with superior transparency and conductivity, owing to specific definitions with respect to the specific thiophene derivative polymer, the water-soluble organic compound, and the dopant.

The transparent conductive film according to the present invention is formed from an organic conductive polymer composition which comprises a thiophene derivative polymer, a water-soluble organic compound (except for nitrogen-containing compounds), and a dopant; and the transparent conductive film has a surface resistivity of 10000 ohms/square or less, and the thiophene derivative polymer is expressed by the formula (1).

The transparent conductive film according to the present invention can be mass-produced into optional shapes with lower cost, are superior in transparency, electrical conductivity, and flexibility, and are preferable for touch panel input devices.

The transparent conductor according to the present invention comprises a transparent conductive film, and a transparent substrate, wherein the transparent conductive film is disposed on the transparent substrate, the transparent conductive film is formed from an organic conductive polymer composition which comprises a thiophene derivative polymer, a water-soluble organic compound (except for nitrogen-containing compounds), and a dopant; and the transparent conductive film has a surface resistivity of 10000 ohms/square or less, and the thiophene derivative polymer is expressed by the formula (1).

The transparent conductor according to the present invention can also be mass-produced into optional shapes with lower cost, are superior in transparency, electrical conductivity, and flexibility, and are preferable for touch panel input devices.

The input device according to the present invention comprises a first conductor, a second conductor, and an insulating spacer disposed between the first conductor and the second conductor, wherein the first conductor is disposed opposite to the second conductor, the first conductor is capable of deforming and contacting partially with the second conductor when being pushed locally, the first conductor comprises a transparent conductive film on a transparent substrate, the transparent conductive film is formed from an organic conductive polymer composition which comprises a thiophene derivative polymer, a water-soluble organic compound (except for nitrogen-containing compounds), and a dopant; and the transparent conductive film has a surface resistivity of 10000 ohms/square or less, and the thiophene derivative polymer is expressed by the formula (1).

The input device according to the present invention hardly undergoes resistance degradation even after prolonged and repeated usages, and represents remarkably improved reliability and lifetime, since the first conductor is according to the present invention in particular; therefore the input device is particularly suited to touch panel input devices that are demanded durability.

The process for producing an input device according to the present invention comprises forming a transparent conductive film on a transparent substrate by use of an organic conductive polymer composition, and disposing oppositely a pair of first electrodes on opposing ends of the transparent conductive film so as to make possible to flow current through the transparent conductive film, thereby to form a first conductor, forming a conductive film on a substrate, and disposing oppositely a pair of second electrodes on opposing ends of the conductive film so as to make possible to flow current through the conductive film, thereby to form a second conductor, and laminating the first conductor and the second conductor in a condition that each of the first electrodes and each of the second electrodes are mutually perpendicular, wherein the organic conductive polymer composition comprises a thiophene derivative polymer, a water-soluble organic compound (except for nitrogen-containing compounds), and a dopant, and the thiophene derivative polymer is expressed by the formula (1).

The process for producing an input device according to the present invention may produce economically and conveniently input devices according to the present invention with sufficient reliability.

In the descriptions throughout this specification, the terms of conductive polymer, conductive film, and conductor mean electrically conductive polymer, electrically conductive film, and electrical conductor, respectively.

Figure 1:
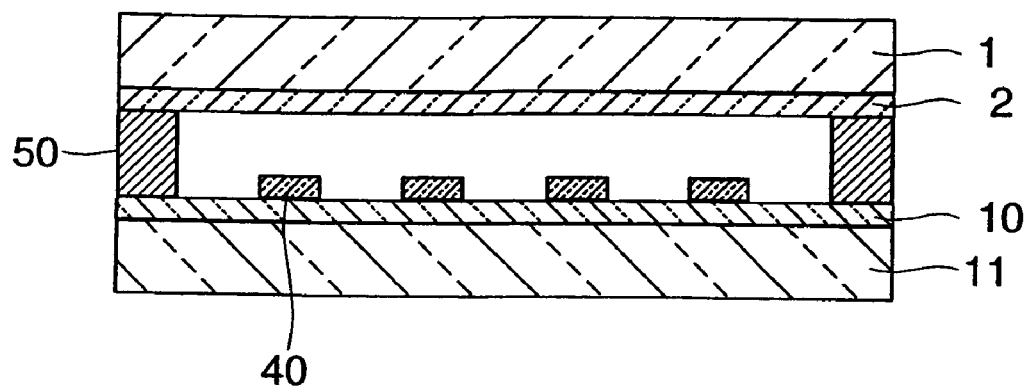
FIG. 1 is a schematic explanatory section view of an input device according to the present invention.

DESCRIPTION OF THE PREFERRED EMBODIMENTS (Input Device)
The input device according to the present invention comprises a first conductor and a second conductor, and other parts selected optionally.

—First Conductor—
The first conductor may be properly selected depending on the application; for example, the first conductor is a transparent conductor that is flexible also, wherein pushing or pressing the first conductor may lead to deformation and partial contact with the second conductor. The term "transparent" embraces colored transparent, colorless translucent, and colored translucent, in addition to colorless transparent.

The transparent conductor according to the present invention comprises a transparent conductive film on a transparent substrate described later. The transparent conductors according to the present invention may be applied to touch panel input devices, capacitors, rechargeable batteries, connecting parts, polymer semiconductors, charge-inhibiting films, displays, energy-transforming elements, resists, and the like.

The transparent conductors according to the present invention may be mass-produced in optional shapes with lower cost, and are superior in transparency, electrical conductivity, and flexibility, thus are appropriate for the transparent conductors in the present invention. Moreover, the transparent conductors according to the present invention may hardly represent degradation in electrical resistance even after prolonged and repeated usages, and may exhibit excellent durability and lifetime, therefore, may be appropriately employed for input devices of touch panels.

—Transparent Substrate—
The substrate may be properly selected from commercially available ones considering the material, shape, construction, thickness, and the like.

The material of the transparent substrate may be selected from resins for example. Examples of the resins include, but not limited to, polyethylene terephthalate resins, polybutylene terephthalate resins, polyethylene naphthalate resins, polyvinyl chloride resins, polyethersulfone resins, polycarbonate resins, polystyrene resins, polyimide resins, polyether imides, polyvinyl acetate resins, polyvinylidene chloride resins, polyvinylidene fluoride resins, polyvinyl alcohol resins, polyvinyl acetal resins, polyvinyl butyral resins, polyacrylonitrile resin, polyolefin polystyrene resins, polyamide resins, polybutadiene resins, cellulose acetate, cellulose nitrate, and acrylonitrile-butadiene-styrene copolymer resins. These may be used alone or in combination. Among these, polyethylene terephthalate resins are preferable from the viewpoint of transparency and flexibility.

Examples of the shape indicated above preferably include plate-like when the substrates are utilized for touch-panel input devices, for example. The construction indicated above may be of one part, or combined shape formed from two or more parts. The thickness indicated above may be properly selected considering mechanical strength and flexibility when the substrates are utilized for touch-panel input devices, for example.

—Transparent Conductive Film—
The transparent conductive film may be properly selected depending on the application, as long as the film is conductive and transparent. Preferably, the transparent conductive film is one according to the present invention.

As for the resistivity of the transparent conductive films, the surface resistivity is required to be 10000 ohms/square or less, more preferably is 5000 ohms/square or less, and still more preferably is 2500 ohms/square or less. When the surface resistivity is more than 10000 ohms/square, the responsibility in terms of inputting is likely to be lower.

The surface resistivity may be measured in accordance with JIS K 6911, ASTM D257, or the like, or may be conveniently measured by using commercially available instruments.

The thickness of the transparent conductive film according to the present invention may be properly selected depending on the application; preferably, the thickness is 0.01 to 10 μm, more preferably is 0.1 to 1 μm. When the thickness is less than 0.01 μm, the resistivity of the transparent conductive film may be unstable, and when the thickness is more than 10 μm, the adhesive ability may be poor with the transparent substrate.

The transparent conductive film according to the present invention may be formed based on conventional processes selected from coating processes or printing processes. These processes may be employed alone or in combination.

Examples of the coating processes include roll coating, bar coating, dip coating, gravure coating, curtain coating, die coating, spray coating, doctor coating, and the like. Examples of the printing process include screen printing, spray printing, ink-jet printing, letterpress printing, intaglio printing, litho printing, and the like.

The transparent conductive film may be formed over the entire surface of the transparent substrate, or over the partial surface of the transparent surface. The latter way may provide an advantage that a blank area is required for forming electrodes or wiring patterns within input devices of touch panels and the like. Namely, such input devices are typically required to remove or to mask ITO conductive layers formed on entire surfaces of the transparent substrates by etching the ITO conductive layer with an etchant or coating the ITO conductive layer with an insulating film, which is complicated and expensive. This problem may be substantially avoided in the latter way, resulting in convenient and economical processes.

The transparent conductive films according to the present invention may be mass-produced into optional shapes with lower cost, and are superior in transparency, electrical conductivity, and flexibility, thus are appropriate for the transparent conductors according to the present invention. Moreover, the transparent conductors according to the present invention may hardly represent degradation in electrical resistance even after prolonged and repeated usages, and may exhibit excellent durability and lifetime, therefore, may be appropriately employed for input devices of touch panels.

The transparent conductive films according to the present invention are solely limited to be comprised of the organic conductive polymer compositions according to the present invention; the shape, construction, size, and the like may be properly selected depending on the application.

The organic conductive polymer composition comprises a polythiophene derivative polymer, a water-soluble organic compound (except for nitrogen-containing organic compounds), and a dopant, and optionally a solvent and other components depending on requirements.

—Thiophene Derivative Polymer—

The thiophene derivative polymers may be expressed by the formula (1) below, which are commercially available or may be synthesized in situ if necessary.

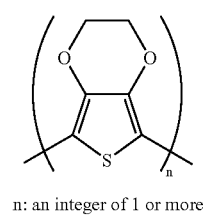

formula (1)

n: an integer of 1 or more

The polythiophene derivative polymers may be properly synthesized by conventional ways as follows, for example:

Initially, 3,4-ethylenedioxythiophene monomer is synthesized from thiodiglycolic acid by the following five-step reaction.

$HO_2C\text{-}S\text{-}CO_2H \xrightarrow{EtOH} EtO_2C\text{-}S\text{-}CO_2Et$ (1) $\xrightarrow{EtO_2C\text{-}CO_2Et, NaOMe}$ 2: $RO_2C$, $HO$, $OH$, $CO_2R'$ (thiophene with hydroxyls) $\xrightarrow{Cl\text{-}Cl, K_2CO_3}$ 3: $RO_2C$—(ethylenedioxythiophene)—$CO_2R'$ $\xrightarrow{1) NaOH, 2) HCl}$ 4: $HO_2C$—(ethylenedioxythiophene)—$CO_2H$ $\xrightarrow{CuO}$ 5: (ethylenedioxythiophene)

(R, R' = Me or Et)

The 3,4-ethylenedioxythiophene monomer can be commercially available from Bayer Co. in the product name of Baytron M™.

Then, the 3,4-ethylenedioxythiophene monomer, ferric p-toluenesulfonate as an oxidizer, and butanol as a solvent are mixed and stirred at 20 to 180° C. for 30 minutes or longer to cause polymerization reaction thereby to synthesize the polythiophene derivative polymers.

Preferably, the concentration of the ferric p-toluenesulfonate is 30 to 60% by mass in the butanol solution; the mass ration of 3,4-ethylenedioxythiophene/ferric p-toluenesulfonate is 1/0.2 to 1/5. Preferably, the content of thiophene derivative polymer is 0.1 to 10% by mass in the organic conductive polymer composition. When the content is less than 0.1% by mass, or more than 10% by mass, the resistance due to the organic conductive polymer composition may not be decrease sufficiently.

—Water-Soluble Organic Compound—

The water-soluble organic compound (except for nitrogen-containing organic compounds) may be properly selected from conventional compounds as long as being water-soluble organic compounds, for example, from oxygen-containing compounds. By the way, the films formed from organic conductive polymer compositions, comprising a nitrogen-containing organic compound, typically represent higher surface resistivity thus are not appropriate for touch panel input devices, therefore, nitrogen-containing organic compounds are excluded from the water-soluble organic compounds in the present invention. On the contrary, the films formed from organic conductive polymer compositions, comprising an oxygen-containing organic compound, typically represent lower surface resistivity thus are appropriate for input devices of touch panel.

With respect to the level of water-soluble, preferably, the water-soluble organic compounds dissolve in a concentration of 1% by mass or more, more preferably, 5% by mass or more in water at 25° C.

The oxygen-containing organic compounds may be compounds containing a hydroxyl group, compounds containing a carbonyl group, compounds containing an ether group, and compounds containing a sulfoxide group, for example.

Examples of the compounds containing a hydroxyl group include ethylene glycol, diethylene glycol, propylene glycol, trimethylene glycol, 1,4-butanediol, and glycerin. Among these, ethylene glycol and diethylene glycol are preferable. Examples of the compounds containing a carbonyl group include isophorone, propylene carbonate, cyclohexanone, and γ-butyrolactone. Example of the compounds containing an ether group includes diethyleneglycol monoethylether. Example of the compounds containing a sulfoxide group includes dimethylsulfoxide.

These may be used alone or in combination. Among these, dimethylsulfoxide, ethylene glycol, and diethylene glycol are preferable. Preferably, the boiling point of the water-soluble organic compounds is 120° C. or more. When the boiling point is less than 120° C., the water-soluble organic compounds easily evaporate, thus the resistance of the organic conductive polymer composition may not be decreased sufficiently.

The content of the water-soluble organic compounds in the organic conductive polymer composition may be properly selected depending on the application; preferably, the content is 0.1 to 50% by mass, more preferably is 1 to 10% by mass. When the content is less than 0.1% by mass, or more than 50% by mass, the resistance of the organic conductive polymer composition may not be decreased sufficiently.

—Dopant—

The dopant may be properly selected from known substances, for example, from electron-accepting substances or electron acceptors. The electron-accepting substances or electron acceptors may be a Lewis acid. The Lewis acid may be selected from sulfonic acid compounds, boric acid compounds, phosphoric acid compounds, and chloric acid compounds, for example.

Examples of the sulfonic acid compounds include polystyrene sulfonic acid, alkylnaphthalene sulfonic acid, methane sulfonic acid, p-toluene sulfonic acid, naphthalene sulfonic acid, trifluoromethane sulfonic acid, camphor sulfonic acid, and polyvinylnaphthalene sulfonic acid.

Example of the boric acid compound includes tetrafluoro boric acid. Example of the phosphoric acid compound includes hexafluoro phosphoric acid. Examples of the chloric acid compounds include perchloric acid, chloric acid, chlorous acid, and hypochlorous acid.

These may be used alone or in combination. Among these, polystyrene sulfonic acid and alkylnaphthalene sulfonic acid are preferable.

The content of the dopant in the organic conductive polymer composition may be properly selected depending on the application; preferably, the content is 5 to 50% by mass, more preferably is 10 to 30% by mass. When the content is less than 5% by mass or more than 50% by mass, the resistance of the organic conductive polymer composition may not be decreased sufficiently. The content of the dopant in the organic conductive polymer composition can be an effective factor to control the resistivity of the transparent conductive film obtained from the organic conductive polymer composition.

—Solvent—

The solvent may be properly selected from those capable of dissolving the polythiophene derivative polymer, the water-soluble organic compound, and the dopant. The solvent may be selected from polar solvents, for example.

Examples of the polar solvents include water; alcohols such as methanol, ethanol, 1-propanol, 2-propanol, and 1-butanol; ketones such as acetone, methyl ethyl ketone, and methyl butyl ketone; esters such as methyl acetate, ethyl acetate, isopropyl acetate, butyl acetate, and methyl propionate. These may be used alone or in combination. Among these, water is preferable from the viewpoint of environmental issue.

—Other Components—

The other components indicated above may be properly selected from known substances depending on the requirements; for example, the other component is selected from UV-light absorbers, anti-oxidants, polymerization inhibitors, surface modifiers, defoamers, plasticizers, and bactericides. These may be used alone or in combination.

The organic conductive polymer compositions according to the present invention may be utilized for various applications such as touch panels, capacitors, rechargeable batteries, connecting parts, polymer semiconductors, charge-inhibiting films, displays, energy-transforming elements, resists, and the like.

In addition, the organic conductive polymer compositions according to the present invention may be utilized for inventive transparent conductive films, inventive transparent conductors, and inventive input devices.

—Second Conductor—

The second conductor is disposed opposite to the first conductor with an insulating spacer interposed between the two conductors. The second conductor may be properly selected from known ones without particular limitations, for example, may be a construction of a conductive film supported of a substrate.

—Substrate—

The substrate may be properly selected as to the material, color, shape, construction, and size depending on the application.

The material of the substrate may be properly selected depending on the application; for example, glasses and resins are preferable from the viewpoint of proper hardness as a substrate and processability to form a conductive layer on the surface.

The resin may be a hard resin. Examples of the hard resins include acrylic resins, methacrylic resins, polyvinyl chloride hard resins, polysulfone resins, polyethersulfone resins, polyetheretherketone resins, polyethylene terephthalate resins, polyacetal resins, polyamide resins, polyimide resins, polyamideimide resins, and polymaleimide resins.

The substrate may be colored or colorless. In the case that the substrate is colorless, it may be colorless and transparent, colorless and translucent, or the like.

The shape of the substrate may be properly selected depending on the application; for example, the shape may be plate-like from the viewpoint of being disposed in liquid crystal displays.

—Conductive Film—

The conductive film may be properly selected from known conductive films; for example may be an ITO conductive film, or a transparent conductive film described above. The ITO conductive films may be produced by conventional ways such as vapor deposit processes or spattering processes.

By the way, a transparent conductor may be employed as the second conductor. In such a case, both of the first conductor and the second conductor exhibit flexibility; consequently, the input device can be disposed in curved shape, therefore, margin to select the design and the site can be expanded more widely, representing the possibility for enhanced light-weight and portability.

—Insulating Spacer—

The insulating spacer described above may be properly selected depending on the application; for example, the material thereof may be an acrylic resin. The process for producing for the insulating spacer may be photolithography, for example.

—Other Parts—

The other parts indicated above may be electrodes, land patterns, wiring patterns, dot spacers, or the like.

The electrodes, land patterns, and wiring patterns may be formed of Ag paste containing polyester. The process for forming the land patterns and wiring patterns may be properly selected from conventional processes for forming electrodes; for example, coating process, printing process, or the like may be utilized. The dot spacer may be formed of an acrylic resin for example; the shape may be dot-like. The process for forming the dot spacer may be photolithography, for example.

The present invention will be explained exemplarily with reference to figures in terms of the input devices according to the present invention in the following.

FIG. 1 is a schematic explanatory section view of an input device according to the present invention. The input device is a touch panel input device, which comprises an inventive transparent conductor and the second conductor that are disposed oppositely each other, and insulating spacer 50 interposed therebetween. The first conductor provides a touch surface, on which information is inputted by a finger, pen, or the like, which is constructed from transparent substrate 1 and inventive transparent conductor 2 on the substrate 1. The second conductor comprises conductive film 10 on substrate 11. Dot spacer 40 is formed on conductive film 10.

In the input device, the first conductor is the inventive transparent conductor and is flexible, therefore, the transparent conductor deforms and transparent conductive film 2 contacts partially with conductive film 10 when the transparent conductor is pushed inward. As the result, a potential can be outputted, and the input device can be activated.

Figure 2:
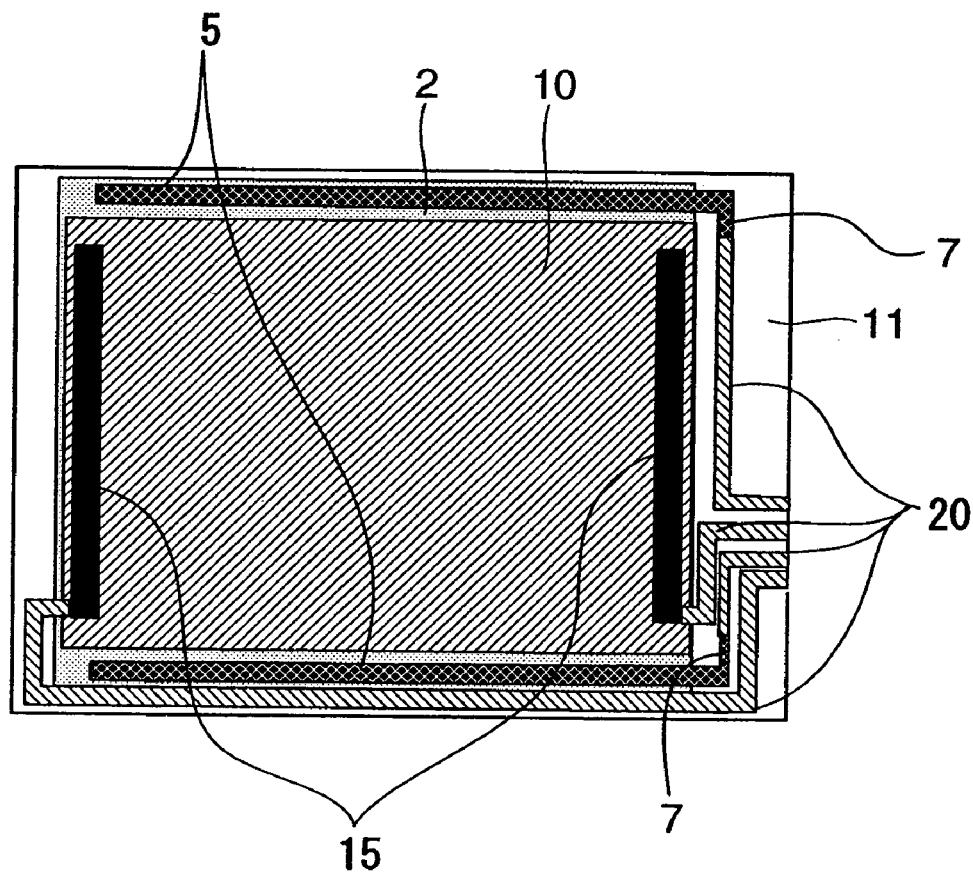
FIG. 2 is a schematic explanatory plan view of an input device according to the present invention.

The inventive input device shown in FIG. 1 will be explained with reference to FIG. 2. FIG. 2 is a schematic plan view of the input device shown in FIG. 1.

As shown in FIG. 2, transparent conductive film 2 is formed on the partial area of the first conductor, and a pair of first electrodes 5 is disposed oppositely in contact with transparent conductive film 2. Land patterns 7 are formed oppositely at insulating portion, where is no contact with transparent conductive film 2, of edge area of the first electrode 5. Wiring patterns 20 are formed also at the insulating portion.

On the other hand, conductive film 10 is formed on the partial area of the second conductor, and is disposed contacting with a pair of conductive film 10. Wiring pattern 20 is formed at the insulating portion where is no contact with conductive film 10.

Accordingly, in the input device, no current flows when the first electric conductor and the second electric conductor do not contact each other; however, when these conductors contact each other, current flows at the site and thus information is inputted.

The input devices according to the present invention are substantially free from resistance degradation even after the prolonged and repeated usages since the first conductor is one according to the present invention. Accordingly, the input devices may present remarkably improved durability and lifetime, thus may be properly utilized for various apparatuses, instruments, and the like, in particular for touch panel input devices that are demanded durability.

The input devices according to the present invention may be produced by a suitable process selected from known producing processes, specifically may be produced by the producing processes according to the present invention.

(Process for Producing Input Device)

The inventive processes for producing input devices comprise producing the first conductor, producing the second conductor, laminating, and other procedures selected depending on the requirements.

—Producing the First Conductor—

In producing the first conductor, the transparent conductive film is formed on the transparent substrate using the inventive organic conductive polymer, a pair of first electrodes is disposed oppositely at the opposing edges of the transparent conductive film so as to flow current through the transparent conductive film, thereby the first conductor is formed.

The transparent substrate, the organic conductive polymer, and the transparent conductive film are those described before.

The first electrode may be properly selected from known ones, for example, may be electrodes produced from Ag paste containing polyester. The process for producing the first electrode may be coating processes or printing processes described before, for example.

The first electrodes are disposed oppositely at both edges of the transparent conductive film such that the first electrodes partially contact with the transparent conductive film so as to flow current through the transparent conductive film.

Preferably, land patterns are disposed at edges of the first electrode. The land patterns are connected to the wiring pattern using a conductive resin, for example, to flow current through the first electrode. Preferably, the land patterns are formed at insulating area where is no contact with the transparent conductive film.

—Producing the Second Conductor—

In producing the second conductor, the conductive film is formed on the substrate, a pair of second electrodes is disposed oppositely at the opposing edges of the conductive film so as to flow current through the conductive film, thereby the second conductor is formed. The substrate and the conductive film are those described before.

The second electrode may be properly selected from known ones, for example, may be electrodes produced from Ag paste containing polyester.

The process for producing the second electrode may be coating processes or printing processes described before, for example.

The second electrodes are disposed oppositely at both edges of the conductive film such that the second electrodes partially contact with the conductive film so as to flow current through the conductive film.

Preferably, wiring patterns are disposed at edges of the first electrode. Preferably, the wiring pattern is formed at insulating area where is no contact with the conductive film, since the wiring pattern makes possible to flow current through the first and second electrodes.

—Laminating—

In laminating, the first conductor and the second conductor are laminated each other in a configuration that the first electrode and the second electrode extend perpendicularly each other.

The process to laminate the first conductor and the second conductor may be selected from known ones; for example, double-sided tapes, adhesives, heating, pressing, and combination thereof may be employed.

Among these, double-sided tapes are preferable. Specifically, the double-sided tape is adhered at outer periphery of the second conductor in a flame configuration, holes are perforated at both edges of one side of the double-sided tape, an conductive resin is filled into the holes, then the second conductor is laminated to the first conductor. In this process, the first conductor and the second conductor are easily provided with continuity after the laminating.

The conductive resin may be properly selected from known ones; for example, may be an epoxy resin.

The inventive process for producing input devices will be exemplarily explained with reference to figures.

Figure 3:
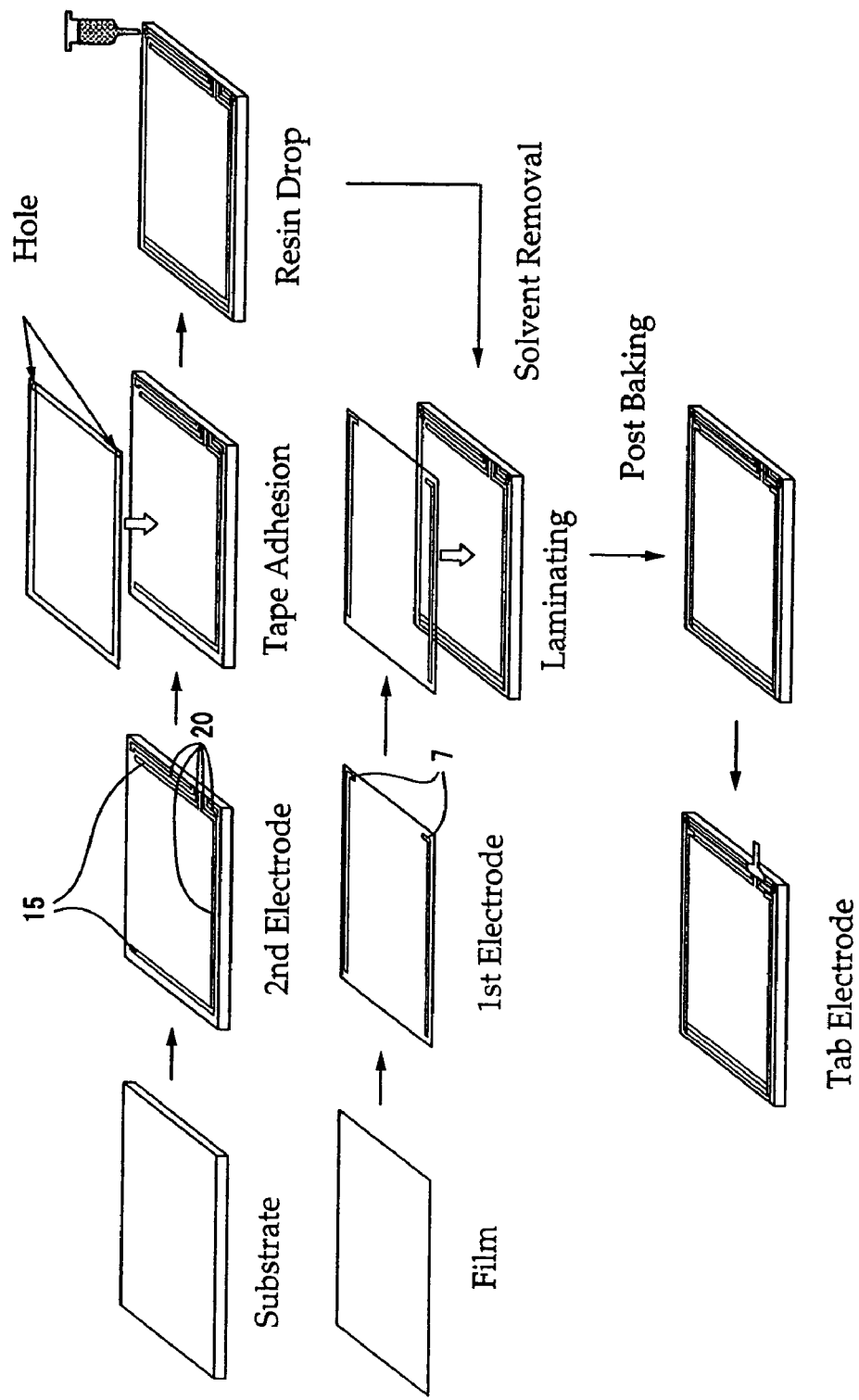
FIG. 3 is a schematic view that explains a process for producing an input device according to the present invention.

Initially, as shown in middle part of FIG. 3, the inventive transparent conductive film (not shown) is formed by printing partially the inventive organic conductive polymer composition on the transparent substrate. Then, a pair of first electrodes is disposed oppositely on the transparent conductive film; and land pattern 7 is formed on the insulating portion, where is no contact with the transparent conductive film, by printing Ag paste using a certain pattern mask, thereby to form the first conductor.

Further, as shown in upper part of FIG. 3, a conductive film of ITO film, for example, is coated on the entire surface of the transparent substrate. Then, the peripheral portion of the conductive film is removed by way of conventional etching procedure through coating a resist, thereby to form the insulating portion; alternatively, the insulating portion may be formed by printing insulating paste at the periphery portion of the conductive film in a conventional way. Thereafter, a pair of second electrodes 15 and wiring pattern 20 are formed on the insulating portion; alternatively, wiring pattern 20 may be formed by printing Ag paste using a certain pattern mask, thereby to produce the second conductor.

Then, as shown in upper part of FIG. 3, the double-sided tape is adhered on the second conductor in a flame configuration, and the conductive resin is filled into a pair of holes at both edges of the double-side tape. Thereafter, the first conductor and the second conductor are laminated each other in a configuration that the first electrode and the second electrode extend perpendicularly each other. The contact of the land pattern 7 and the conductive resin at laminating procedure may afford continuity of the first electrode after the laminating is completed.

The inventive input devices may be produced conveniently and efficiently by way of the above described inventive processes for producing input devices.

Hereinafter, the present invention will be described specifically by examples with reference to figures, but it should be understood that the present invention is not limited thereto. In the examples, the inventive input devices are produced by the inventive process, the input devices comprise the inventive transparent conductors that utilize the inventive transparent conductive films that are formed from the inventive organic conductive polymer compositions.

EXAMPLE 1

—Preparation of Organic Conductive Polymer Composition—

An organic conductive polymer composition was prepared by mixing poly(3,4-ethylenedioxythiophene) expressed by formula (I) doped by polystyrene sulfonic acid (Denatron #5002T, by Nagase & Co., Ltd.), ethylene glycol (boiling point: 197.2° C., by Wako Pure Chemical Industries, Ltd.) as the water-soluble organic compound and water as the solvent, thereby to prepare a solution of conductive polymer composition of Example 1. The poly(3,4-ethylenedioxythiophene) was doped by 30% by mass of polystyrene sulfonic, the concentration of the doped poly(3,4-ethylenedioxythiophene) was 2% by mass in the solution, and the concentration of the ethylene glycol was 5% by mass in the solution.

EXAMPLE 2

—Preparation of Organic Conductive Polymer Composition—

An organic conductive polymer composition of Example 2 was prepared in the same manner as Example 1, except for changing the ethylene glycol into diethylene glycol (boiling point: 244.3° C., by Wako Pure Chemical Industries, Ltd.).

EXAMPLE 3

—Preparation of Organic Conductive Polymer Composition—

An organic conductive polymer composition of Example 3 was prepared in the same manner as Example 1, except for changing the ethylene glycol into dimethyl sulfoxide (boiling point: 189.0° C., by Wako Pure Chemical Industries, Ltd.).

EXAMPLE 4

—Preparation of Organic Conductive Polymer Composition—

An organic conductive polymer composition of Example 4 was prepared in the same manner as Example 1, except for changing the ethylene glycol into propylene glycol (boiling point: 187.4° C., by Wako Pure Chemical Industries, Ltd.).

EXAMPLE 5

—Preparation of Organic Conductive Polymer Composition—

An organic conductive polymer composition of Example 5 was prepared in the same manner as Example 1, except for changing the ethylene glycol into trimethylene glycol (boiling point: 213.5° C., by Wako Pure Chemical Industries, Ltd.).

EXAMPLE 6

—Preparation of Organic Conductive Polymer Composition—

An organic conductive polymer composition of Example 6 was prepared in the same manner as Example 1, except for changing the ethylene glycol into 1,4-butanediol (boiling point: 235.0° C., by Wako Pure Chemical Industries, Ltd.).

EXAMPLE 7

—Preparation of Organic Conductive Polymer Composition—

An organic conductive polymer composition of Example 7 was prepared in the same manner as Example 1, except for changing the ethylene glycol into glycerin (boiling point: 290.0° C., by Wako Pure Chemical Industries, Ltd.).

COMPARATIVE EXAMPLE 1

—Preparation of Organic Conductive Polymer Composition—

An organic conductive polymer composition of Comparative Example 1 was prepared in the same manner as Example 1, except for changing the ethylene glycol into N,N-dimethylformamide (by Wako Pure Chemical Industries, Ltd.).

COMPARATIVE EXAMPLE 2

—Preparation of Organic Conductive Polymer Composition—

An organic conductive polymer composition of Comparative Example 2 was prepared in the same manner as Example 1, except for changing the ethylene glycol into N-methyl-2-pyrrolidone (by Wako Pure Chemical Industries, Ltd.).

EXAMPLE 8

—Preparation of First Conductive Film and First Conductor—

The organic conductive polymer composition prepared in Example 1 was coated on a transparent substrate of polyethylene terephthalate resin (188 μm thick, 297 mm×210 mm, by Toray Industries, Inc.) using a bar coater (No. 9, wet coat: 20 μm thick). The coating was formed over the entire surface of the transparent substrate except for the peripheral region; consequently, insulating portion remained at the outer margin of the transparent substrate. Then, the coating was dried by heating at 120° C. for 10 minutes to form the first conductive film of about 0.4 μm thick, which is a transparent conductive film according to the present invention, on the transparent substrate. The surface resistivity of the transparent conductive film was measured in accordance with JIS K6911. The results are shown in Table 1.

Then, as shown in middle part of FIG. 3, a pair of first electrodes disposed oppositely at both edges of the first conductive film, and land patterns 7 disposed at the insulating portion were formed by printing Ag paste containing polyester (DW-250-H5, Toyobo Co., Ltd.) to form the first conductor, which is the transparent conductor according to the present invention.

EXAMPLES 9 TO 14

—Preparation of First Conductive Film and First Conductor—

First transparent conductive films, each being about 0.4 μm thick, and first conductors of Examples 9 to 14 were prepared in the same manner as Example 8, except for changing the organic conductive polymer composition prepared in Example 1 into those prepared in Examples 2 to 7 respectively; and the surface resistivities were measured. The results are shown in Table 1.

COMPARATIVE EXAMPLE 3

—Preparation of First Conductive Film and First Conductor—

ITO conductive film of about 0.02 μm thick as the first transparent conductive film was formed over the entire surface of transparent substrate of polyethylene terephthalate resin (188 μm thick, 297 mm×210 mm, by Toray Industries, Inc.). Then, the insulating portion, where the ITO conductive film being masked, was formed by coating a resist on the ITO conductive film and etching the outer periphery of the ITO conductive film in a conventional manner. The surface resistivity of the first conductive film i.e. ITO conductive film was measured in the same manner as Example 8. The results are shown in Table 1.

Then, as shown in middle part of FIG. 3, a pair of first electrodes disposed oppositely and land pattern 7 disposed at the insulating portion were formed by printing Ag paste containing polyester (DW-250-H5, Toyobo Co., Ltd.) on the first transparent conductive film using a certain pattern mask, to form the first conductor of Comparative Example 1.

COMPARATIVE EXAMPLES 4 AND 5

—Preparation of First Conductive Film and First Conductor—

First transparent conductive films of Comparative Examples 4 and 5, each being about 0.4 μm thick, were prepared in the same manner as Example 8, except for changing the organic conductive polymer composition prepared in Example 1 into those prepared in Comparative Examples 1 and 2 respectively; and the surface resistivities were measured. The results are shown in Table 1.

EXAMPLE 15

—Production of Touch Panel Input Device—

A touch panel input device was produced by the procedures shown in FIG. 3. Initially, an ITO conductive film was formed on the entire surface of a glass plate (1.1 mm thick, 400 mm×300 mm) as the substrate by a vacuum vapor deposition process as shown in the upper part of FIG. 3. Then, the ITO conductive film, where wiring pattern 20 being formed, was removed by a conventional etching process to form an insulating portion. Then, a dot spacer of 5 μm thick was formed on the ITO conductive film using an acrylic resin by a photolithography process.

Then, a pair of second electrodes 15 disposed at both edges of the ITO conductive film and wiring pattern 20 disposed at the insulating portion, where the ITO conductive film being removed, were formed by printing Ag paste containing polyester (DW-250-H5, Toyobo Co., Ltd.) using a certain pattern mask, thereby to form the second conductor. Thereafter, a double-sided tape was adhered on the resulting second conductor in a frame manner, as shown in upper part of FIG. 3, and an conductive epoxy resin (XA-910, Fujikura Kasei Co., Ltd.) was filled drop by drop into a pair of holes provided previously on the double-sided tape.

Next, using the first conductor of Example 8, the first conductor and the second conductor were laminated such that the first electrode on the first conductor and the second electrode on the second conductor were perpendicular and such that land pattern 7 contacted with the conductive resin. Then, a tab electrode for connecting wire was contact-bonded with the wiring pattern, thereby to produce a touch panel input device. The resulting touch panel input device was evaluated with respect to the linearity shift in a way described below. The results are shown in Table 2.

—Evaluation of Linearity Shift—

Linearity shift was evaluated as resistivity change in a way that a letter was repeatedly inputted on the touch surface of the resulting touch panel input device and the potentials at the first and the second electrodes were measured, and then the linearity shift (ΔE) was obtained. The same letter was inputted repeatedly till the maximum resistivity change exceeded 1.5%, and the times of letter inputs were counted when the maximum resistivity change reached 1.5%.

EXAMPLE 16

—Production of Touch Panel Input Device—

As shown in upper part of FIG. 3, the organic conductive polymer composition prepared in Example 2 was coated on a glass plate (1.1 mm thick, 400 mm×300 mm) as the substrate using a bar coater (No. 9, wet coat: 20 μm thick). The coating was formed over entire surface of the glass plate except for the peripheral region; consequently, insulating portion was formed at the outer margin. Then, the coating was dried by heating at 120° C. for 10 minutes to form the conductive film of about 0.4 μm thick. Then, a dot spacer of 5 μm thick was formed on the conductive film using an acrylic resin by a photolithography process. The conductive film was substantially the same as the transparent conductive film prepared in Example 9.

Then, a pair of second electrodes 15 disposed at both edges of the conductive film, and wiring pattern 20 disposed at the insulating portion were formed by printing Ag paste containing polyester (DW-250-H5, Toyobo Co., Ltd.) to form the second conductor.

Then, a double-sided tape was adhered on the second conductor in a frame configuration, as shown in upper part of FIG. 3, and an conductive epoxy resin (XA-910, Fujikura Kasei Co., Ltd.) was filled drop by drop into a pair of holes provided previously within the double-sided tape.

Next, using the first conductor of Example 9, the first conductor and the second conductor were laminated such that the first electrode on the first conductor and the second electrode on the second conductor were perpendicular and such that land pattern 7 contacted with the conductive resin. Then, a tab electrode for connecting wire was contact-bonded with the wiring pattern, thereby to produce the touch panel input device. The resulting touch panel input device was evaluated with respect to the linearity shift in the same manner as Example 15. The results are shown in Table 2.

EXAMPLE 17

—Production of Touch Panel Input Device—

A touch panel input device was produced in the same manner as Example 15, except that the first conductor of Example 8 was changed into the first conductor of Example 10, and the organic conductive polymer composition of Example 2 for preparing the second conductor was changed into the organic conductive polymer composition of Example 3. The resulting touch panel input device was evaluated with respect to the linearity shift. The results are shown in Table 2.

COMPARATIVE EXAMPLE 6

—Production of Touch Panel Input Device—

A touch panel input device was produced in the same manner as Example 15, except that the first conductor of Example 8 was changed into the first conductor of Comparative Example 3. The resulting touch panel input device was evaluated with respect to the linearity shift. The results are shown in Table 2.

TABLE 1

| First Conductor | Composition | Water-Soluble Compound | Boiling Point (° C.) | Surface Resistivity (ohm/square) |
| --- | --- | --- | --- | --- |
| Example 8 | Example 1 | ethylene glycol | 197.2 | 1600 |
| Example 9 | Example 2 | diethylene glycol | 244.3 | 1500 |
| Example 10 | Example 3 | dimethyl sulfoxide | 189.0 | 1800 |
| Example 11 | Example 4 | propylene glycol | 187.4 | 2160 |
| Example 12 | Example 5 | trimethylene glycol | 213.5 | 2010 |
| Example 13 | Example 6 | 1,4-butanediol | 235.0 | 2490 |
| Example 14 | Example 7 | glycerin | 290.0 | 1820 |
| Comp. Ex. 3 (ITO) | — | — | — | 4000 |
| Comp. Ex. 4 | Comp. Ex. 1 | N,N-dimethylformamide | 153.0 | 2720 |
| Comp. Ex. 5 | Comp. Ex. 2 | N-methyl-2-pyrrolidone | 202.0 | 3000 |

The results of Table 1 demonstrate that transparent conductive films of Examples 8 to 14 exhibit significantly lower surface resistivities compared to the ITO conductive film of Comparative Example 3 and the conductive films of Comparative Examples 4 and 5, which is believed owing to the facts that each of the water-soluble organic compounds of Examples 8 to 14 represents a boiling point of 120° C. or more and also includes no nitrogen content.

TABLE 2

| Touch Panel Input device | First Conductor | Lifetime of Touch Panel (Input Times) |
| --- | --- | --- |
| Example 15 | Example 8 | $7.5 \times 10^5$ |
| Example 16 | Example 9 | $8.4 \times 10^5$ |
| Example 17 | Example 10 | $4.5 \times 10^5$ |
| Comp. Ex. 6 | Com. Ex. 3 (ITO) | $2.0 \times 10^5$ |

The results of Table 2 indicate that the resistance degradation of the touch panel input devices of Examples 15 to 17 is

What is claimed is:

1. An input device comprising:
    a first conductor, a second conductor, and an insulating spacer disposed between the first conductor and the second conductor,
    wherein the first conductor is disposed opposite to the second conductor,
    the first conductor is capable of deforming and contacting partially with the second conductor when being pushed locally,
    the first conductor comprises a transparent conductive film on a transparent substrate,
    the transparent conductive film is formed from an organic conductive polymer composition which comprises
    a thiophene derivative polymer,
    a water-soluble organic compound
    0% of a nitrogen-containing organic compound, and
    a dopant;
    wherein the transparent conductive film has a surface resistivity of 5000 ohms/square or less, and
    wherein thiophene derivative polymer is expressed by the formula (1)

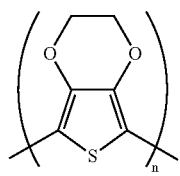

formula (1)

n: an integer of 1 or more.

2. The input device according to claim 1, wherein the second conductor comprises a conductive film on a substrate,
    the conductive film being one of
        a film of indium tin oxide, and
        a transparent conductive film formed from an organic conductive polymer composition which comprises
            a thiophene derivative polymer,
            a water-soluble organic compound,
            0% of a nitrogen-containing organic compound, and
            a dopant;
    wherein the transparent conductive film has a surface resistivity of 10000 ohms/square or less, and
    wherein the thiophene derivative polymer is expressed by the formula (1)

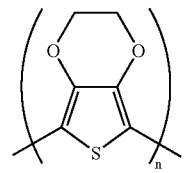

formula (1)

n: an integer of 1 or more.

3. The input device according to claim 1, wherein the second conductor comprises a transparent conductive film on a transparent substrate,
    the transparent conductive film being formed from an organic conductive polymer composition which comprises
        a thiophene derivative polymer,
        a water-soluble organic compound,
        0% of a nitrogen-containing organic compound, and
        a dopant;
    wherein the transparent conductive film has a surface resistivity of 10000 ohms/square or less, and
    wherein the thiophene derivative polymer is expressed by the formula (1)

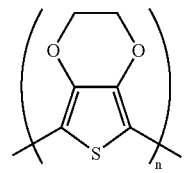

formula (1)

n: an integer of 1 or more.

4. The input device according to claim 1, wherein the input device is a touch panel input device.

5. The input device according to claim 1, wherein the water-soluble organic compound is ethylene glycol, and the content of ethylene glycol in the organic conductive polymer composition is 1% by mass to 10% by mass.

6. The input device according to claim 1, wherein the dopant is selected from the group consisting of Lewis acids.

7. The input device according to claim 1, wherein the dopant is selected from the group consisting of sulfonic acid compounds, boric acid compounds, phosphoric acid compounds, and chloric acid compounds.

8. The input device according to claim 1, wherein the organic conductive polymer composition further comprises water.

9. The input device according to claim 1, wherein the transparent conductive film has a surface resistivity of 2,500 ohms/square or less.